US012695124B2

(12) United States Patent
Lee et al.

(10) Patent No.: US 12,695,124 B2
(45) Date of Patent: Jul. 28, 2026

(54) BATTERY PACK

(71) Applicant: SAMSUNG SDI CO., LTD., Yongin-si (KR)

(72) Inventors: Hyeok Lee, Yongin-si (KR); Younghwan Kwon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 757 days.

(21) Appl. No.: 18/073,086

(22) Filed: Dec. 1, 2022

(65) Prior Publication Data

US 2023/0178815 A1     Jun. 8, 2023

(30) Foreign Application Priority Data

Dec. 2, 2021     (KR) ........................ 10-2021-0171258

(51) Int. Cl.

| | |
|---|---|
| *H01M 10/42* | (2006.01) |
| *H01M 50/209* | (2021.01) |
| *H01M 50/262* | (2021.01) |
| *H01M 50/271* | (2021.01) |
| *H01M 50/284* | (2021.01) |
| *H01M 50/287* | (2021.01) |
| *H01M 50/298* | (2021.01) |
| *H01M 50/507* | (2021.01) |

(Continued)

(52) U.S. Cl.
CPC ..... *H01M 10/4257* (2013.01); *H01M 50/209* (2021.01); *H01M 50/262* (2021.01); *H01M 50/271* (2021.01); *H01M 50/284* (2021.01); *H01M 50/287* (2021.01); *H01M 50/298* (2021.01); *H01M 50/507* (2021.01); *H01M*

*50/519* (2021.01); *H01M 50/569* (2021.01); *H01M 2010/4271* (2013.01)

(58) Field of Classification Search
None
See application file for complete search history.

(56) References Cited

U.S. PATENT DOCUMENTS

| | | | |
|---|---|---|---|
| 11,309,590 B2 | 4/2022 | Kwon et al. | |
| 2011/0300433 A1 | 12/2011 | Kim | |
| 2012/0328908 A1 | 12/2012 | Han et al. | |

(Continued)

FOREIGN PATENT DOCUMENTS

| | | |
|---|---|---|
| CN | 102270754 A | 9/2014 |
| CN | 213878287 U | 8/2021 |

(Continued)

OTHER PUBLICATIONS

European Search Report dated May 4, 2023 for corresponding Patent Application No. 22211053.8.

(Continued)

*Primary Examiner* — Jonathan Crepeau
(74) *Attorney, Agent, or Firm* — Lee IP Law, P.C.

(57) ABSTRACT

A battery pack includes a plurality of battery cells; a support plate on the plurality of battery cells and having a plurality of bus bars electrically connecting the plurality of battery cells to one another; a cover over the support plate; a controller on an inner side of the cover; and a circuit board on one side of the support plate to be connected to the plurality of battery cells, the circuit board having a connection wire extending toward the cover and being connected to the controller.

16 Claims, 9 Drawing Sheets

(51) Int. Cl.
H01M 50/519 (2021.01)
H01M 50/569 (2021.01)

(56) References Cited

U.S. PATENT DOCUMENTS

| | | | |
|---|---|---|---|
| 2017/0194681 | A1 | 7/2017 | Kim et al. |
| 2019/0088918 | A1 | 3/2019 | Goh et al. |
| 2020/0194843 | A1 | 6/2020 | Kwon et al. |

FOREIGN PATENT DOCUMENTS

| | | | |
|---|---|---|---|
| DE | 102019220396 | * | 6/2021 |
| EP | 3042404 | B1 | 8/2014 |
| JP | 6354514 | B2 | 7/2018 |
| KR | 10-2013-0023059 | A | 3/2013 |
| KR | 10-2017-0003791 | A | 1/2017 |
| KR | 10-1833526 | B1 | 2/2018 |
| KR | 10-2019-0051237 | A | 5/2019 |
| KR | 10-2258837 | B1 | 6/2021 |

OTHER PUBLICATIONS

Korean Notice of Allowance dated Mar. 25, 2024, of the corresponding KR Patent Application No. 10-2021-0171258.
Korean Office Action dated Dec. 19, 2023, of the corresponding KR Patent Application No. 10-2021-0171258.
Chinese Office action dated Aug. 29, 2025, for corresponding CN Patent Application No. 202211541627.9.

* cited by examiner

BATTERY PACK

CROSS-REFERENCE TO RELATED APPLICATION

This application is based on and claims priority under 35 U.S.C. § 119 to Korean Patent Application No. 10-2021-0171258, filed on Dec. 2, 2021, in the Korean Intellectual Property Office, the disclosure of which is incorporated by reference herein in its entirety.

BACKGROUND

1. Field

One or more embodiments relate to a battery pack.

2. Description of the Related Art

The term "secondary battery" refers to batteries that are repeatedly chargeable and dischargeable, unlike non-re-chargeable primary batteries. Secondary batteries may be used as energy sources of mobile devices, electric vehicles, hybrid vehicles, electric bicycles, or uninterruptible power supplies. Secondary batteries may be used individually, or may be used as modules each including a plurality of batteries connected to one another as one unit, according to the types of external devices using secondary batteries.

SUMMARY

The embodiments may be realized by providing a battery pack including a plurality of battery cells; a support plate on the plurality of battery cells and having a plurality of bus bars electrically connecting the plurality of battery cells to one another; a cover over the support plate; a controller on an inner side of the cover; and a circuit board on one side of the support plate to be connected to the plurality of battery cells, the circuit board having a connection wire extending toward the cover and being connected to the controller.

The connection wire may have one end connected to an end of the circuit board in a length direction and another end connected to an end of the controller in the length direction, and includes a folding portion of which at least a portion is rounded between the circuit board and the controller.

The folding portion may be closer to an end of the cover in the length direction than to a central axis of the cover.

The folding portion may not be fixed to the support plate and the cover when the cover is being closed.

The cover may be spaced apart from an upper surface of the support plate, and the folding portion may be between the upper surface of the support plate and a lower surface of the cover.

The folding portion may be bent convexly toward the outside of the support plate and the cover in the length direction.

The circuit board may include a pair of wing portions adjacent to an end of the support plate, and the connection wire may extend from one side of the circuit board located further inside than ends of the wing portions so that a most protruding portion of the folding portion does not deviate from the end of the support plate.

The connection wire may have portions facing each other while the cover is being closed.

The connection wire may be disposed such that a portion thereof on the cover faces the circuit board disposed on the support plate.

The support plate may include one or more support ribs in contact with the cover.

The one or more support ribs may separate the cover from an upper surface of the support plate by a predetermined height, and at least a portion of the connection wire may be between the support plate and the cover.

The one or more support ribs may be provided with one or more locking portions for fixing corners of the cover.

The controller may be arranged to share a central axis with the cover.

The controller may be fixed to the cover through heat staking.

The controller may be detachable from the cover through one or more hooks inside the cover.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
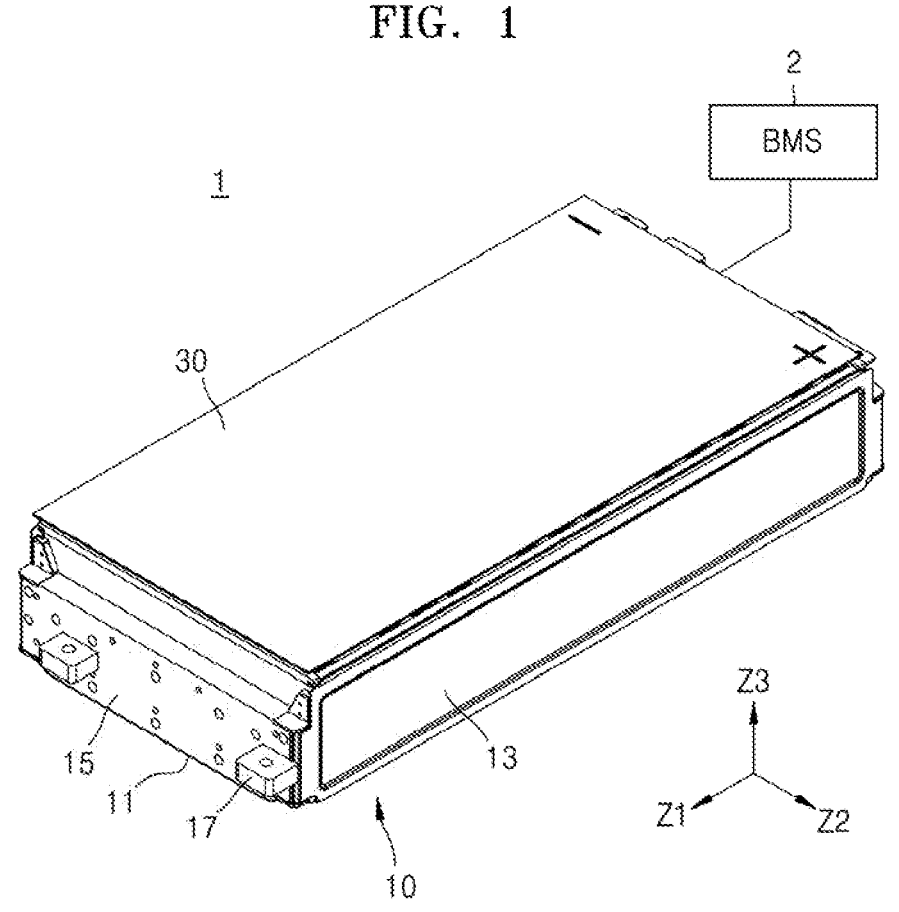
FIG. 1 shows a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Expressions such as "one or more of," when preceding a list of elements, modify the entire list of elements and do not modify the individual elements of the list.

Figure 2:
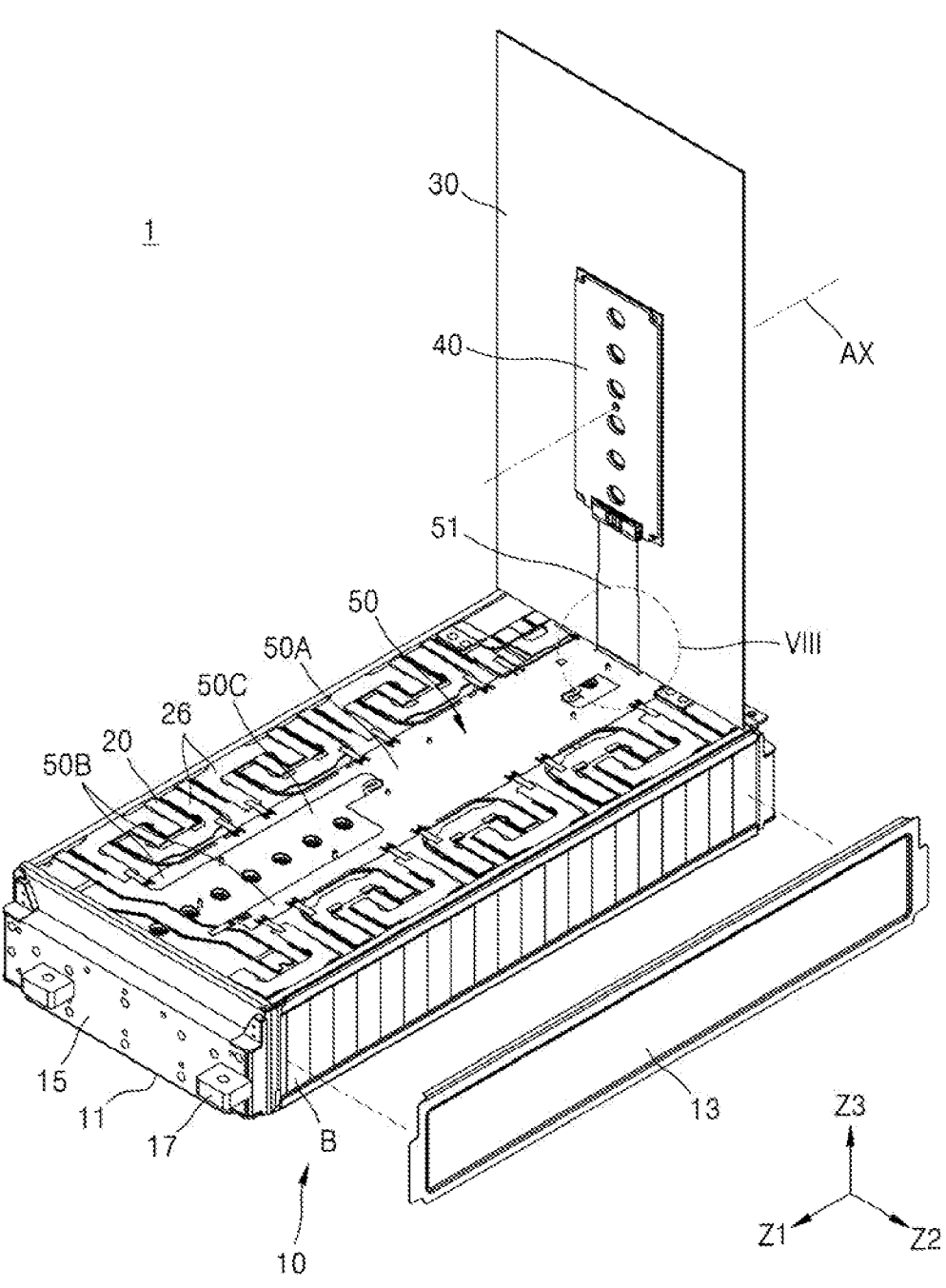
FIG. 2 shows the battery pack of FIG. 1 of which a cover is open.
Figure 3:
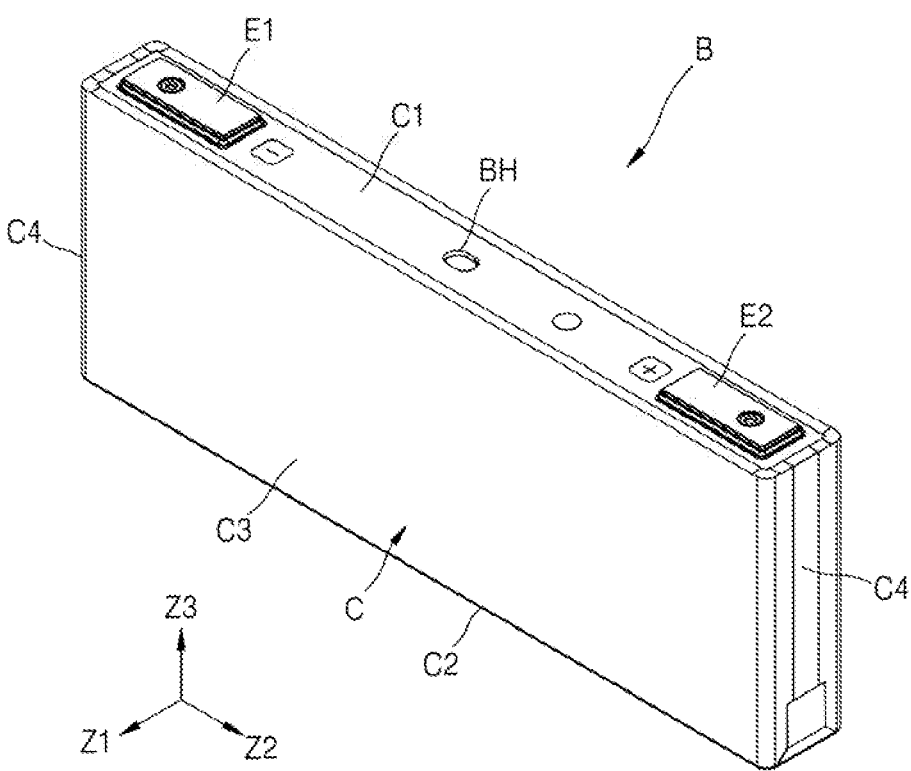
FIG. 3 shows a battery cell.
Figure 4:
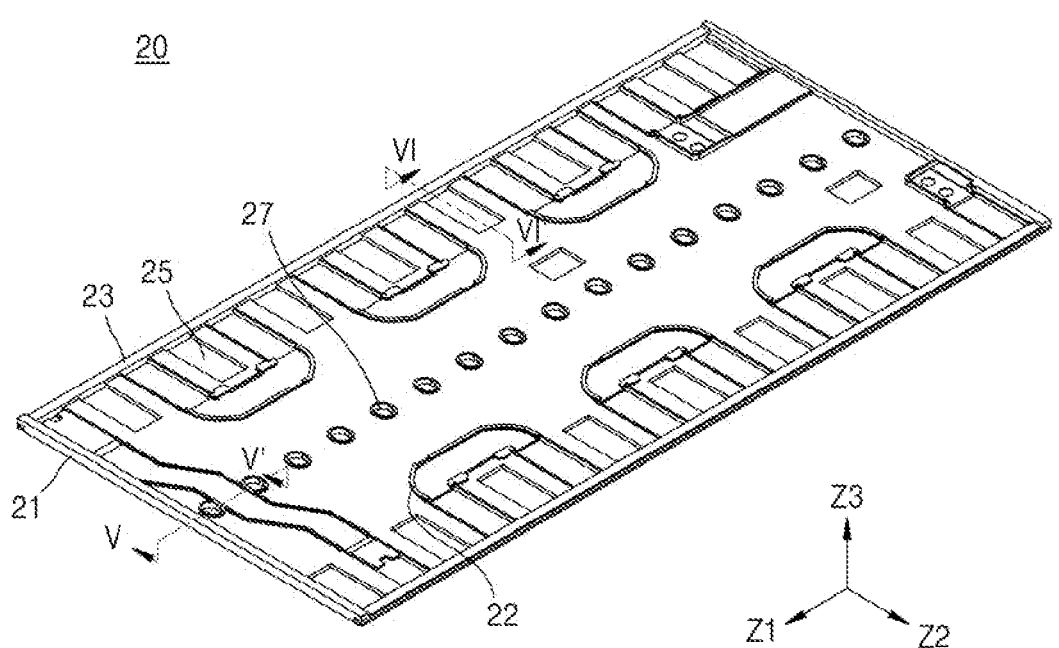
FIG. 4 shows a support plate.
Figure 5:
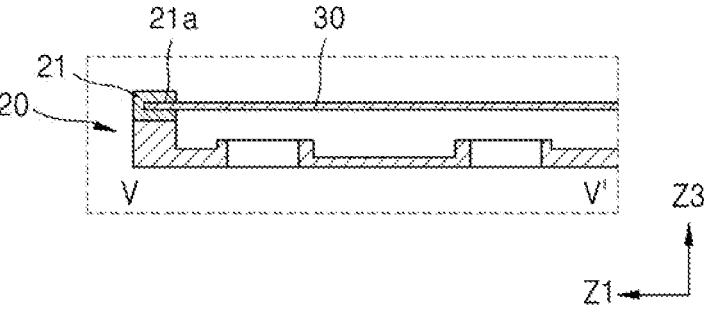
FIG. 5 is a cross-section taken along line V-V' of FIG. 4.
Figure 6:
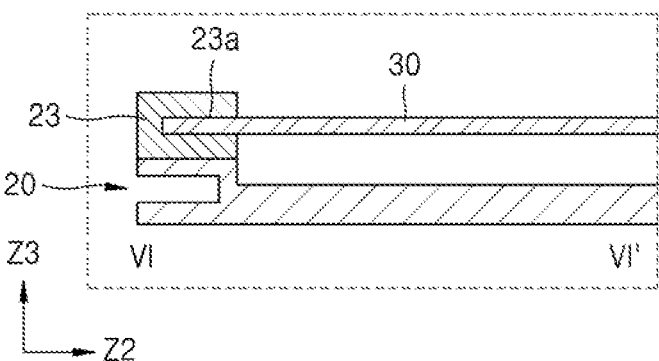
FIG. 6 is a cross-section taken along line VI-VI' of FIG. 5.
Figure 7:
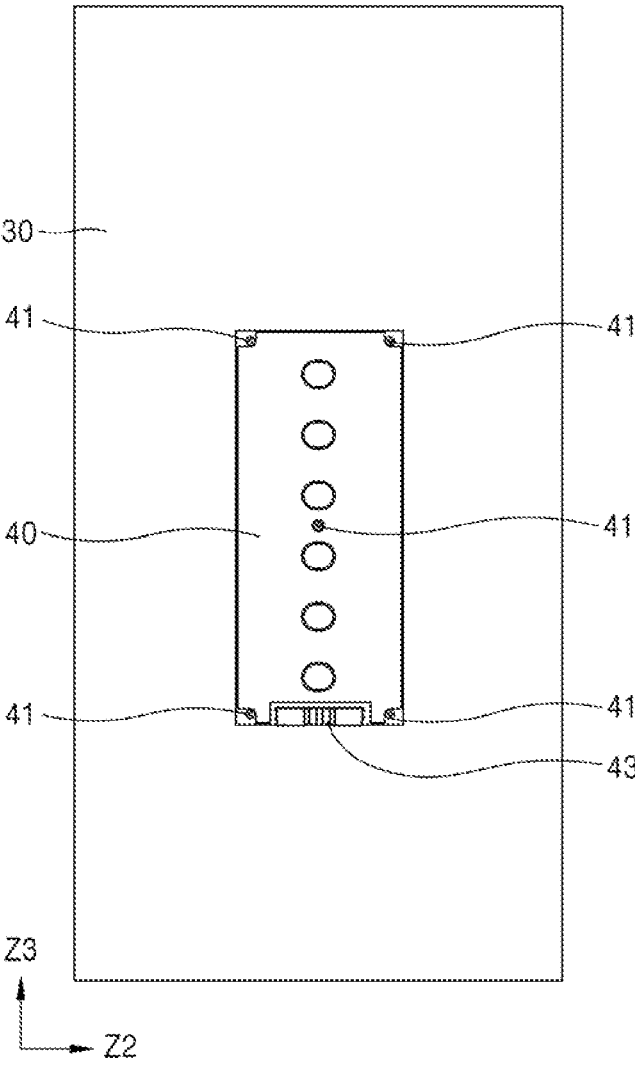
FIG. 7 shows the cover and a controller.
Figure 8:
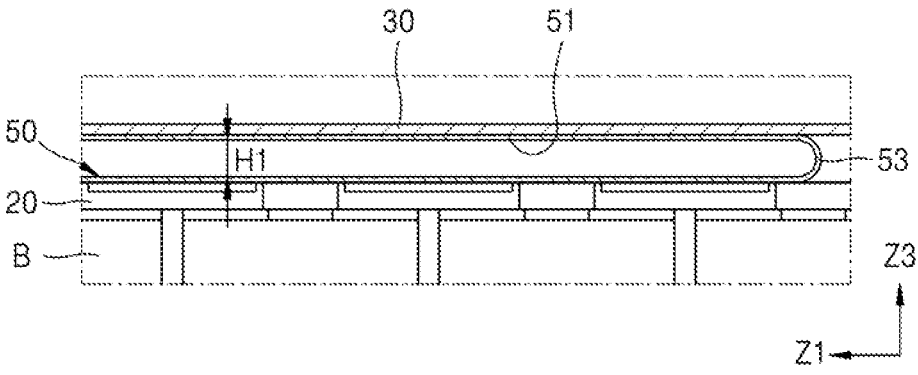
FIG. 8 shows a magnification of a portion VIII of FIG. 2.
Figure 9:
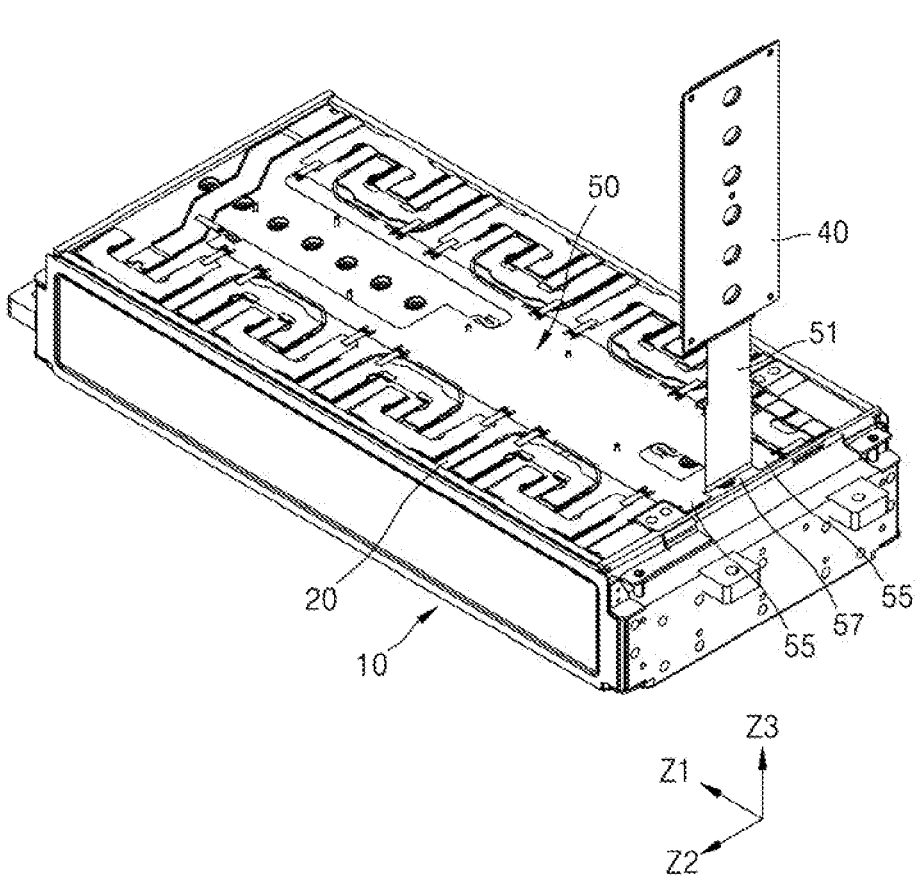
FIG. 9 shows the battery pack according to an embodiment as viewed from another angle.

FIG. 1 shows a battery pack 1 according to an embodiment, FIG. 2 shows the battery pack 1 of which a cover 30 of FIG. 1 is open, FIG. 3 shows a battery cell B, and FIG. 4 shows a support plate 20. FIG. 5 is a cross-section taken along line V-V' of FIG. 4, FIG. 6 is a cross-section taken along line VI-VI' of FIG. 5, FIG. 7 shows the cover 30 and a controller 40, FIG. 8 shows a magnification of a portion VIII of FIG. 2, and FIG. 9 shows the battery pack 1 according to an embodiment as viewed from another angle, the cover not being shown in FIG. 9.

Referring to FIGS. 1 through 9, the battery pack 1 according to an embodiment may include a plurality of battery cells B, a support plate 20 disposed on the plurality of battery cells B and including a plurality of bus bars 26 electrically connecting the plurality of battery cells B to one another, a cover 30 disposed over the support plate 20, a controller 40 disposed on the inner side of the cover 30, and a circuit board 50 disposed on one side of the support plate 20 so as to be connected to the battery cells B, the circuit board 50 including a connection wire 51 connected to the controller 40 by extending toward the cover 30.

The battery pack 1 according to an embodiment may include the plurality of battery cells B. Each of the battery cells B may include a case C and an electrode assembly (not shown) accommodated in the case C. The electrode assembly may include a first electrode plate and a second electrode plate having different polarities, and a separator disposed between the first electrode plate and the second electrode plate. The first electrode plate and the second electrode plate of the electrode assembly may be electrically connected to first and second electrodes E1 and E2 of the battery cell B, which are different from each other, respectively.

The first and second electrodes E1 and E2 of the battery cell B may be disposed on the case C. Charging and discharging paths of the battery cell B may be connected to the electrode assembly inside the case C through the first and second electrodes E1 and E2 formed on the case C. As will be described later, the first and second electrodes E1 and E2 formed on the case C may be electrically connected to different battery cells B through a bus bar 26.

The case C of the battery cell B may have a rectangular parallelepiped shape. For example, the case C may include an electrode surface C1 on which the first and second electrodes E1 and E2 are disposed, a bottom surface C2 positioned opposite to the electrode surface C1, a pair of main surfaces C3 connecting the electrode surface C1 to the bottom surface C2 and having a relatively large area compared to the electrode surface C1 and the bottom surface C2, and a pair of lateral surfaces C4 having a relatively narrow area compared to the main surface C3. For example, a plurality of battery cells B according to an embodiment may be disposed in a first direction Z1, and adjacent battery cells B may be disposed such that their respective main surfaces C3 face each other.

The first and second electrodes E1 and E2 may be arranged in a second direction Z2 crossing the first direction Z1 in which the battery cells B are arranged. The second direction Z2 in which the first and second electrodes E1 and E2 are arranged may correspond to a direction crossing the first direction Z1 in which the plurality of battery cells B are arranged. For example, according to an embodiment, the second direction Z2 may correspond to a direction perpendicular to the first direction Z1.

A vent hole BH may be disposed between the first and second electrodes E1 and E2. The vent hole BH may be ruptured when the pressure of the gas generated inside the battery cell B exceeds a critical pressure, thereby releasing an internal pressure of the battery cell B.

According to an embodiment, the plurality of battery cells B may be electrically connected to one other through the bus bars 26. An input/output terminal (not shown) may be connected to the battery cells B at both ends of the plurality of battery cells B electrically connected to one other.

The housing 10 may accommodate the plurality of battery cells B. The plurality of battery cells B may be arranged in the housing 10 in the first direction Z1. The housing 10 may have an internal space in which the plurality of battery cells B may be accommodated, and may have a rectangular parallelepiped shape with an open upper surface. The housing 10 may include a bottom surface 11, a lateral surface 13, a front frame 15, and a rear frame (not shown).

The bottom surface 11 may be disposed on the bottom of the housing 10 to support the battery cells B accommodated in the inner space. The battery cells B may be seated on an upper surface of the bottom surface 11. A pair of lateral surfaces 13 may be disposed on both sides of the bottom surface 11, and may be disposed to face each other in the second direction Z2. The front frame 15 and the rear frame (not shown) may be respectively disposed on front and rear sides of the housing 10, respectively, to face each other. Accordingly, a space in which the plurality of battery cells B are accommodated may be defined by the bottom surface 11, the pair of lateral surfaces 13, the front frame 15, and the rear frame.

A connector for connecting the battery pack 1 with another external device such as a vehicle may be provided. A plurality of connectors, for example, two or more connectors 17, may be disposed on one of the front frame 15 and the rear frame, and may include a connection hole for connection to the external device.

The support plate 20 may be disposed on the housing 10 and may include the plurality of bus bars 26. As shown in FIG. 2, the support plate 20 may be disposed on the plurality of battery cells B to cover the open upper surface of the housing 10. The support plate 20, which may be a rectangular flat plate, may include a pair of longer edges each extending in the first direction Z1 and a pair of shorter edges each extending in the second direction Z2. The support plate 20 may cover the plurality of battery cells B, and may support other members of the battery pack 1, such as the bus bars 26 and the circuit board 50.

As shown in FIG. 4, the support plate 20 may include a first support rib 21, a second support rib 23, a seating groove 25, and a vent connection hole 27.

The first support rib 21 may extend along an edge of the support plate 20. For example, first support ribs 21 may extend along a pair of shorter edges of the support plate 20, respectively. The pair of first support ribs 21 may be disposed to face each other in the first direction Z1.

According to an embodiment, as shown in FIG. 5, the first support rib 21 may include a locking portion 21a for fixing the cover 30. The locking portion 21a may be a groove that is recessed inwardly along the inner surface of the first support rib 21. The locking portion 21a may form a space into which one edge of the cover 30 may be inserted. Accordingly, while the cover 30 is covering the upper surface of the battery pack 1, at least a portion of the edge of the cover 30 may be inserted into the locking portion 21a and thus may be fixed. The locking portion 21a may be formed on one or both of the pair of first support ribs 21.

The second support rib 23 may extend along an edge of the support plate 20. For example, second support ribs 23 may extend along a pair of longer edges of the support plate 20, respectively. The pair of second support ribs 23 may be disposed to face each other in the second direction Z2.

According to an embodiment, as shown in FIG. 6, the second support rib 23 may include a locking portion 23a for fixing the cover 30. The locking portion 23a may be a groove that is recessed inwardly along the inner surface of the second support rib 23 so as to form a space into which one one edge of the cover 30 may be the inserted. Accordingly, while the cover 30 is covering the upper surface of the battery pack 1, at least a portion of the edge of the cover 30 may be inserted into the locking portion 23a and thus' the cover may be fixed. The locking portion 23a may be formed on one or both of the pair of second support ribs 23.

Accordingly, when the cover 30 is disposed to cover the upper surface of the battery pack 1, at least a portion of the edge of the cover 20 may be fixed by being inserted into the locking portion 21a of the first support rib 21 and/or the locking portion 23a of the second support rib 23.

The seating groove 25 is a slit formed by cutting one side of the support plate 20. As shown in FIGS. 2 and 4, a plurality of seating grooves 25 may be formed to be spaced apart from each other by a predetermined interval in the first direction Z1. The seating grooves 25 may be arranged in two or more rows in the first direction Z1. When the support plate 20 is seated on the plurality of battery cells B, the seating grooves 25 may be seated on the first terminals E1 and the second terminals E2 of the battery cells B.

The shape and size of the seating groove 25 may correspond to the shape and size of the first terminal E1 and the second terminal E2 of the battery cell B. For example, in the first direction Z1, the seating grooves 25 in one row may be seated on the first terminal E1 or the second terminal E2, and the seating grooves 25 in the remaining rows may be seated on the other terminal. The first terminal E1 and the second terminal E2 may be supported by the seating grooves 25.

While the seating grooves 25 are being seated on the first terminal E1 and the second terminal E2, the bus bars 26 may be disposed to contact the first terminal E1 and the second terminal E2 exposed to the outside through the seating grooves 25. The bus bar 26 may be disposed on one or a plurality of seating grooves 25 among the seating grooves 25 in a first row in the first direction Z1, and may be connected to the first terminal E1 and the second terminal E1 of the battery cell B.

According to an embodiment, when one bus bar 26 is seated on the seating grooves 25 in the first row arranged in the first direction Z1, the bus bar 26 may not be seated on immediately adjacent seating grooves 25. For example, as shown in FIG. 2, the bus bar 26 may have a U-shape, and, when one end of the bus bar 26 is seated in one seating groove 25, the other end thereof may be seated on a seating groove 25 next to the one seating groove 25, without being seated on a seating groove 25 adjacent to the one seating groove 25 in the first direction Z1. Accordingly, one bus bar 26 may be connected to two battery cells B spaced apart from each other in the first direction Z1 with one battery cell B interposed therebetween. A battery cell B not connected to the one bus bar 26 may be disposed between both ends of the one bus bar 26.

According to an embodiment, the bus bars 26 may be arranged such that one end of another bus bar 26 may be inserted between both ends of one bus bar 26. For example, as shown in FIG. 2, two bus bars 26 may be arranged to form a group. Accordingly, the plurality of battery cells B may be arranged in the first direction Z1, and one bus bar 26 may be arranged such that both ends thereof are in contact with the electrodes of two battery cells B, respectively, and a remaining bus bar 26 may be arranged such that one end thereof is inserted between both ends of the one bus bars 26 and contacts the electrode of a battery cell B.

A bus bar sheet 22 for fixing the position of each bus bar 26 may be further disposed on the upper surface of the support plate 20. The bus bar sheet 22 may protrude to a predetermined height on the upper surface of the support plate 20, and the bus bar 26 may be disposed inside the bus bar sheet 22.

A plurality of vent connection holes 27 may be arranged in the first direction Z1 on the upper surface of the support plate 20. The vent connection holes 27 may be disposed to be spaced apart from their adjacent vent connection holes 27 by a predetermined distance in the first direction Z1. While the support plate 20 is disposed on the battery cells B, each of the vent connection holes 27 may be positioned to correspond to the vent hole BH of each of the battery cells B. Accordingly, the gas ejected due to breakage of the vent hole BH may be connected to a separate exhaust device through the vent connection hole 27 and thus may be discharged to the outside.

The cover 30 may be disposed over the support plate 20 to cover respective upper portions of the battery cells B. The cover 30 may have a shape and size corresponding to the open upper surface of the housing 10 or the support plate 20. The position of the cover 30 may be fixed by the first support ribs 21 and/or the second support ribs 23 of the support plate 20.

According to an embodiment, the cover 30 may not contact the support plate 20 and may be spaced apart from the upper surface of the support plate 20 by a predetermined height. For example, as shown in FIG. 8, the upper surface of the circuit board 50 disposed on the support plate 20 and the lower surface of the controller 40 disposed inside the cover 30 may be spaced apart from each by a first height H1, while the cover 30 is covering the battery cells B. Accordingly, a free space may be formed in which the connection wire 51 extending from the circuit board 50 disposed on the support plate 20 is bent.

According to an embodiment, the cover 30 may be formed of a soft or hard material. For example, the cover 30 may be made of polycarbonate (PC) or polypropylene (PP).

The controller 40 may monitor the state of the battery pack 1 and transmit the monitored state to a battery monitoring system (BMS) 2. For example, the controller 40 may monitor the state of each of the battery cells B included in the battery pack 1, monitor a voltage between terminals, the potential of the case C, an internal resistance, the temperature of the case C, a separation distance between the battery cell B and the housing 10, and the like in real time, and transmit a result of the monitoring to the BMS 2.

According to an embodiment, the controller 40 may be connected wirelessly to the BMS 2, without a separate communication cable connected to the BMS 2. Because the controller 40 does not need a separate LV connector or the like, the overall size of the battery pack 1 may be reduced.

The controller 40 may be formed of a soft or hard material. For example, the controller 40 may be formed of polyimide (PI) as a soft material, or may be formed of FR4 as a hard material.

According to an embodiment, the controller 40 may be disposed on one side of the cover 30. For example, the controller 40 may be disposed on the inner surface of the cover 30 so as to be disposed inside the battery pack 1, instead of being attached to the housing 10 or being disposed outside the battery pack 1. The disposition of the controller 40 inside the battery pack 1 may enable the minimization of an increase in the volume of the battery pack 1.

According to an embodiment, the controller 40 may be disposed to share a central axis with the cover 30. As shown in FIG. 2, the cover 30 may have a central axis AX in length and width directions, and the controller 40 may be disposed on the inner surface of the cover 30 to share the central axis AX.

According to an embodiment, the controller 40 may be fixed to the cover 30 through heat staking. For example, the controller 40 may be fixed to the cover 30 via heat staking at a temperature of 150 to 200° C. The controller 40 may include a plurality of fixing parts 41. For example, as shown in FIG. 7, the controller 40 may include fixing parts 41 at four corners and at a center, respectively.

According to another embodiment, the controller 40 may be mechanically fixed to the cover 30. For example, the controller 40 may be screwed to the cover 30 through the fixing parts 41. In some embodiments, the controller 40 may include hook-type fixing parts 41 so as to be detachably coupled to the cover 30.

The controller 40 may include a connector part 43 to which the connection wire 51 of the circuit board 50 is connected. The connector part 43 may be disposed on one end of the controller 40. For example, the connector part 43 may be formed on an end of the controller 40 in the length direction. The connection wire 51 extending from the circuit board 50 may be bent toward the cover 30 and then connected to the connector part 43. Accordingly, when the cover 30 is coupled to the controller 40, the controller 40 may be disposed to face the circuit board 50.

The circuit board 50 may be disposed on one side of the support plate 20 to be connected to the battery cells B and the controller 40. For example, as shown in FIG. 2, the circuit board 50 may be disposed on the upper surface of the support plate 20 and may be electrically connected to the plurality of bus bars 26. When the bus bars 26 are arranged in two rows in the first direction Z1, the circuit board 50 may be disposed between the two rows of the bus bars 26. According to an embodiment, the circuit board 50 may be a flexible printed circuit board (FPCB).

According to an embodiment, when the circuit board 50 is disposed on the support plate 20, the circuit board 50 may be disposed such that at least some of the plurality of vent connection holes 27 of the support plate 20 are exposed. For example, as shown in FIG. 2, when the circuit board 50 is disposed on the support plate 20, a cover region 50A covering some of the plurality of vent connection holes 27 formed in the support plate 20 may be formed. An extension region 50B may be formed on both sides of the cover region 50A in the second direction Z2. A pair of extension regions 50B may each extend in the first direction Z1 from both ends of the cover region 50A, and an exposed portion 50C may be formed between the pair of extension regions 50B so that one or more vent connection holes 27 are exposed. The pair of extension regions 50B may be electrically connected to the bus bars 26 arranged in two rows.

According to an embodiment, the circuit board 50 may include the connection wire 51. The connection wire 51 may extend from one side of the circuit board 50 toward the cover 30 and may be connected to the controller 40. For example, one end of the connection wire 51 may be connected to an end of the circuit board 50 in the length direction (e.g., the first direction Z1), and the other end may be connected to an end of the controller 40 in the length direction.

According to an embodiment, the connection wire 51 may include a folding portion 53. The folding portion 53 may be disposed between the circuit board 50 and the controller 40. At least a portion thereof may be rounded. For example, as shown in FIG. 8, the connection wire 51 may extend from the circuit board 50 disposed on the support plate 20 to the controller 40 disposed on the cover 30. When the cover 30 is disposed to be spaced apart from the circuit board 50 in a height direction (for example, the third direction Z3), the connection wire 51 may be naturally bent, and thus the folding portion 53 may be formed.

The folding portion 53 may be disposed at a gap between the upper surface of the circuit board 50 and the lower surface of the controller 40, and at least a portion thereof may be rounded. For example, the folding portion 53 may be convexly bent outwardly in the length direction (e.g., the first direction Z1) of the support plate 20 and the cover 30.

According to an embodiment, the folding portion 53 may be disposed closer to an end of the cover 30 than to the central axis AX of the cover 30. For example, as shown in FIG. 8, while the cover 30 is being closed, the folding portion 53 may be convexly bent outwardly, and, in this case, the folding portion 53 may be disposed to be biased in the length direction (e.g, the first direction Z1) of the cover 30 rather than the central axis AX of the cover 30.

According to an embodiment, while the cover 30 is being closed, the folding portion 53 may not be fixed to the support plate 20 and the cover 30. For example, as shown in FIG. 8, the folding portion 53 may be disposed at a gap between the support plate 20 and the cover 30, and thus may not be connected to the support plate 20 and the cover 30.

The circuit board 50 may further include a wing portion 55. As shown in FIG. 9, the wing portion 55 may be disposed on the support plate 20, and may be located on an end of the support plate 20, more specifically, on an end of the support plate 20 in the length direction (e.g., the first direction Z1). In detail, the wing portion 55 may be disposed adjacent to the end of the support plate 20 in a direction in which the connection wire 51 extends from the end of the circuit board 50. A pair of wing portions 55 may be disposed, and an exposed portion 57 in which the circuit board 50 is not disposed may be disposed between the pair of wing portions 55 so that the upper surface of the support plate 20 is exposed.

The connection wire 51 may extend from one side of the circuit board 50 positioned further inside than an end of the wing part 55. For example, as shown in FIG. 9, a pair of wing portions 55 may be adjacently disposed on an end of the support plate 20 in the length direction (e.g., the first direction Z1). The connection wire 51 may extend from one side of the circuit board 50 positioned further inside (or rearwards) in the length direction than the end of the wing portion 55. In other words, the circuit board 50 may not be disposed on the exposed portion 57 positioned between the pair of wing portions 55, and accordingly, a portion of the folding portion 53 most protruding in the longitudinal direction may be disposed so as not to deviate from the end of the support plate 20. Accordingly, while the cover 30 is being closed, the folding portion 53 may not protrude outwards between the support plate 20 and the cover 30.

According to an embodiment, the connection wire 51 may be disposed to have portions facing each other. For example, as shown in FIG. 8, when the cover is closed, the circuit board 50 disposed on the support plate 20 and the controller 40 disposed on the cover 30 face each other. The connection wire 51 connecting one end of the circuit board 50 to one end of the controller 40 is also disposed such that its portions face each other in the third direction Z3.

In a battery pack according to an embodiment, a controller for detecting an abnormal operation of a battery cell is arranged inside a cover instead of being arranged in the housing or outside of the battery pack, and thus the overall size of the battery pack may be reduced.

In the battery pack according to an embodiment, due to the arrangement of the controller inside the cover, the controller may be easily replaced together with the cover if the controller were to fail.

In the battery pack according to an embodiment, the controller may be arranged inside the cover rather than on a lateral surface of the housing, and thus the controller may be effectively protected from an external impact.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a plurality of battery cells;
a support plate on the plurality of battery cells and having a plurality of bus bars electrically connecting the plurality of battery cells to one another;
a cover over the support plate;
a controller on an inner side of the cover; and
a circuit board on one side of the support plate to be connected to the plurality of battery cells, the circuit board and the controller directly facing each other, and the circuit board having a connection wire extending toward the cover and being connected to the controller.

2. The battery pack as claimed in claim 1, wherein:
the connection wire has one end connected to an end of the circuit board in a length direction and another end connected to an end of the controller in the length direction, and includes a folding portion of which at least a portion is rounded between the circuit board and the controller.

3. The battery pack as claimed in claim 2, wherein the folding portion is closer to an end of the cover in the length direction than to a central axis of the cover.

4. The battery pack as claimed in claim 2, wherein the folding portion is not fixed to the support plate and the cover when the cover is being closed.

5. The battery pack as claimed in claim 2, wherein:
the cover is spaced apart from an upper surface of the support plate, and
the folding portion is between the upper surface of the support plate and a lower surface of the cover.

6. The battery pack as claimed in claim 2, wherein the folding portion is bent convexly toward the outside of the support plate and the cover in the length direction.

7. The battery pack as claimed in claim 2, wherein:
the circuit board includes a pair of wing portions adjacent to an end of the support plate, and
the connection wire extends from one side of the circuit board located further inside than ends of the wing portions so that a most protruding portion of the folding portion does not deviate from the end of the support plate.

8. The battery pack as claimed in claim 1, wherein the connection wire has portions facing each other while the cover is being closed.

9. The battery pack as claimed in claim 8, wherein the connection wire is disposed such that a portion thereof on the cover faces the circuit board disposed on the support plate.

10. The battery pack as claimed in claim 1, wherein the support plate includes one or more support ribs in contact with the cover.

11. The battery pack as claimed in claim 10, wherein:
the one or more support ribs separate the cover from an upper surface of the support plate by a predetermined height, and
at least a portion of the connection wire is between the support plate and the cover.

12. The battery pack as claimed in claim 10, wherein the one or more support ribs are provided with one or more locking portions for fixing corners of the cover.

13. The battery pack as claimed in claim 1, wherein the controller is arranged to share a central axis with the cover.

14. The battery pack as claimed in claim 1, wherein the controller is fixed to the cover through heat staking.

15. The battery pack as claimed in claim 1, wherein the controller is detachable from the cover through one or more hooks inside the cover.

16. A battery pack, comprising:
a plurality of battery cells;
a support plate on the plurality of battery cells and having a plurality of bus bars electrically connecting the plurality of battery cells to one another;
a cover over the support plate;
a controller on an inner side of the cover; and
a circuit board on one side of the support plate to be connected to the plurality of battery cells, the circuit board having a connection wire extending toward the cover and being connected to the controller,
wherein the connection wire has one end connected to an end of the circuit board in a length direction and another end connected to an end of the controller in the length direction, and includes a folding portion of which at least a portion is rounded between the circuit board and the controller.

* * * * *